March 18, 1924.
C. P. ROSS
1,486,923
AUTOMATIC REVERSIBLE HOIST
Filed July 22, 1921  4 Sheets-Sheet 1
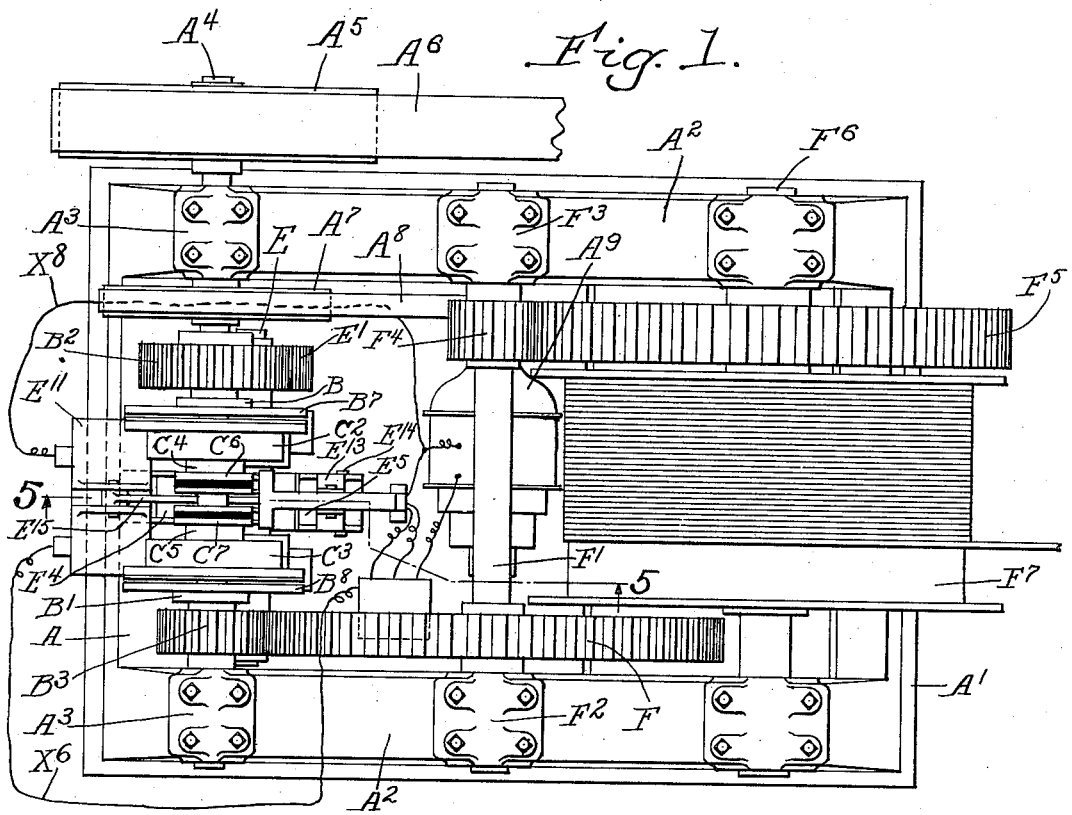
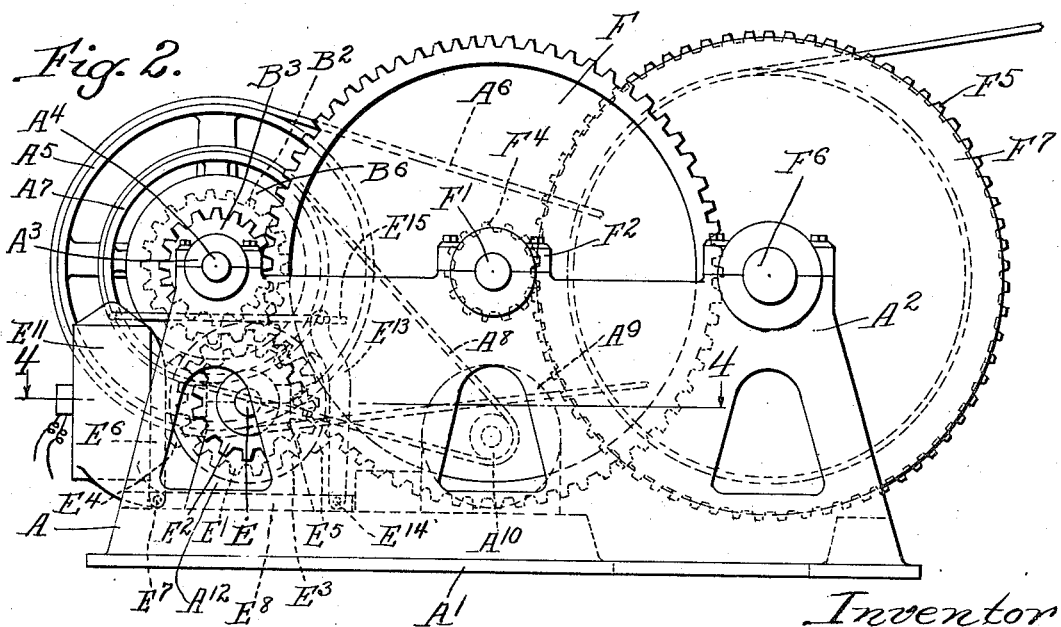
Witness
Edward T. Wray.
Inventor
Clyde P. Ross,
by Parker & Carter
Attorneys

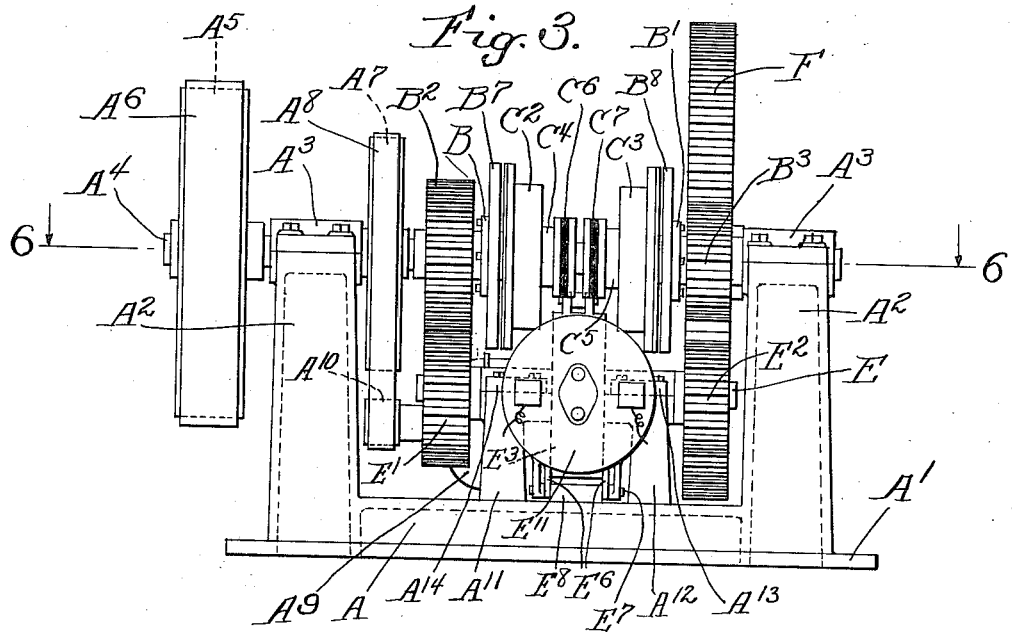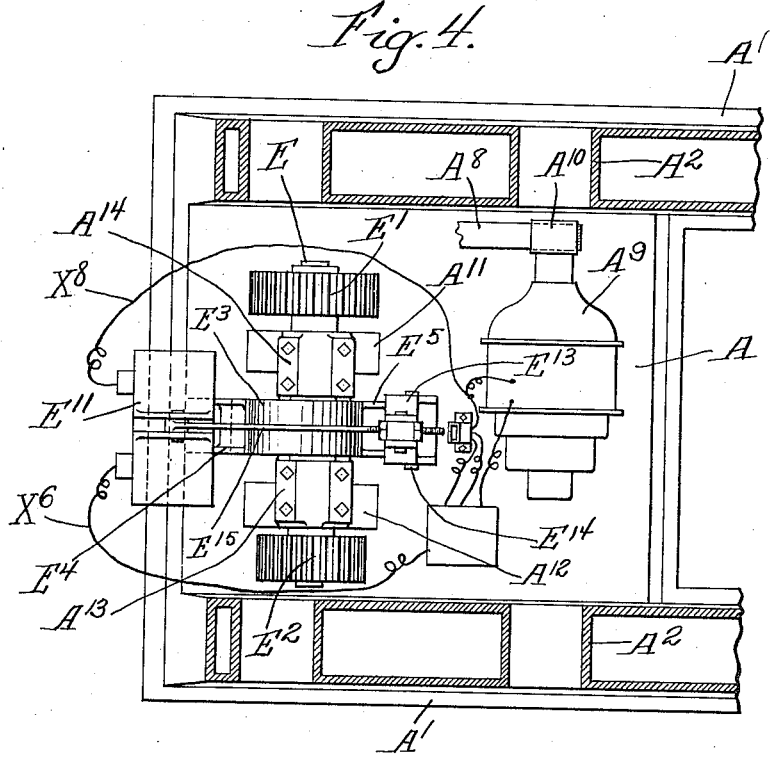

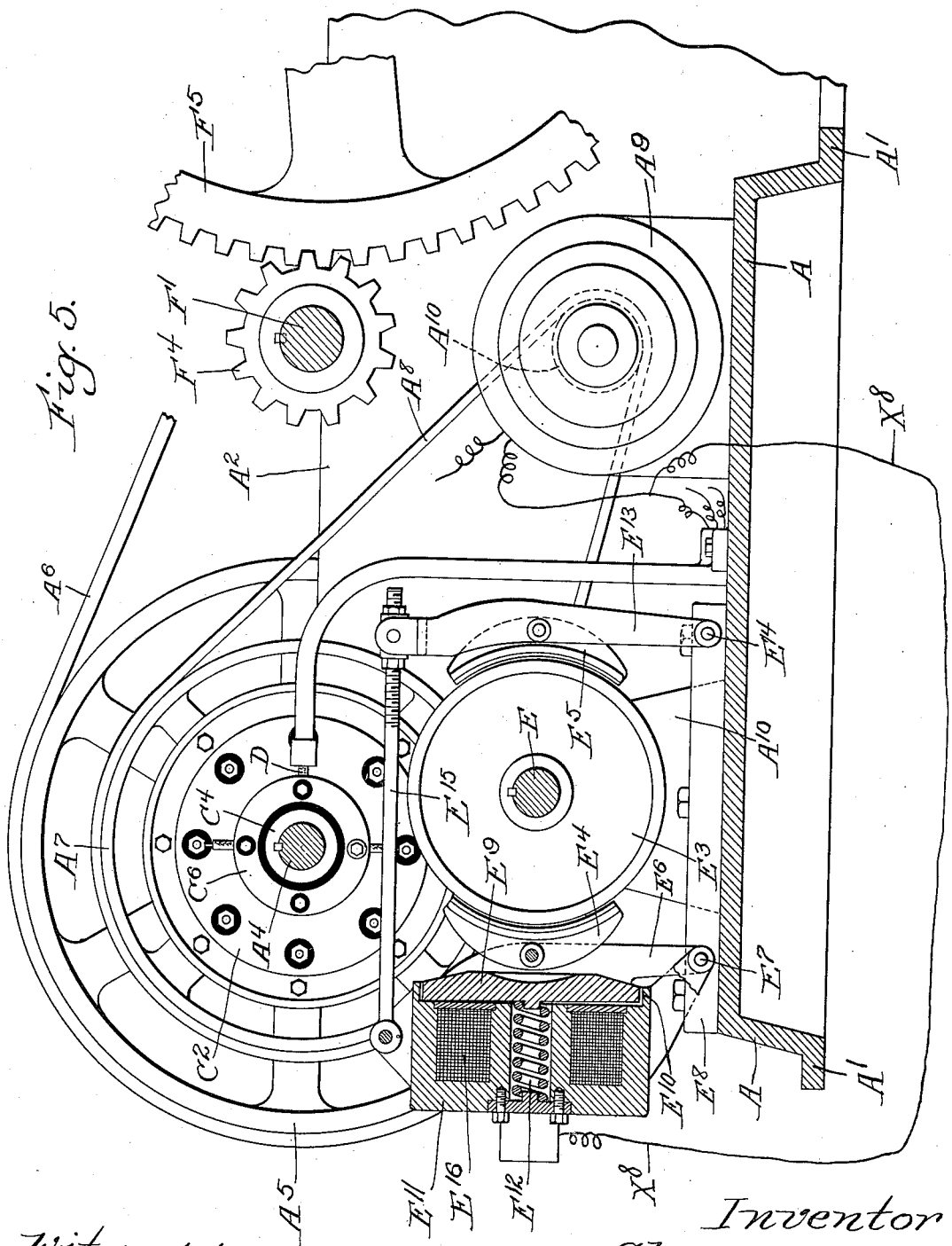

March 18, 1924.

C. P. ROSS

AUTOMATIC REVERSIBLE HOIST 1,486,923

Filed July 22, 1921  4 Sheets-Sheet 4

Witness
Edward T. Wray

Inventor
Clyde P. Ross
By Parker & Carter
Attorneys

Patented Mar. 18, 1924.

1,486,923

UNITED STATES PATENT OFFICE.

CLYDE P. ROSS, OF CHICAGO, ILLINOIS, ASSIGNOR TO ROBERTS AND SCHAEFER COMPANY, OF CHICAGO, ILLINOIS, A CORPORATION OF ILLINOIS.

AUTOMATIC REVERSIBLE HOIST.

Application filed July 22, 1921. Serial No. 486,733.

*To all whom it may concern:*

Be it known that I, CLYDE P. ROSS, a citizen of the United States, residing at Chicago, in the county of Cook and State of Illinois, have invented a certain new and useful Improvement in Automatic Reversible Hoists, of which the following is a specification.

My invention relates to improvements in reversing mechanisms and more particularly to automatic reversible hoists, and has for one purpose the production of a hoist wherein the excursion of the hoist and the period of loading and dumping at each end of the hoist's excursion are accurately and automatically timed. A further object is the provision of a hoist as above described, the clutches of which shall be electrically operated, the electrical energy for such operation being provided, if desired, from a generator driven by or in connection with the conveyor mechanism. A further object is the provision of a brake which shall be operative while the clutches are inoperative at the termination of the hoist's excursion. Other objects will appear from time to time in the course of the specification.

I illustrate the invention more or less diagrammatically in the following drawings, wherein:

Figure 1 is a plan view of the hoist;

Fig. 2 is a side elevation;

Fig. 3 is a front end elevation of the hoist;

Fig. 4 is a plan view of the lower portion or level of the hoist; the frame being shown in section along the line 4—4 of Fig. 2.

Fig. 5 is a section with parts in elevation, along the staggered line 5—5 of Fig. 1;

Like parts are indicated by like symbols throughout the specification and drawings.

Figure 6:
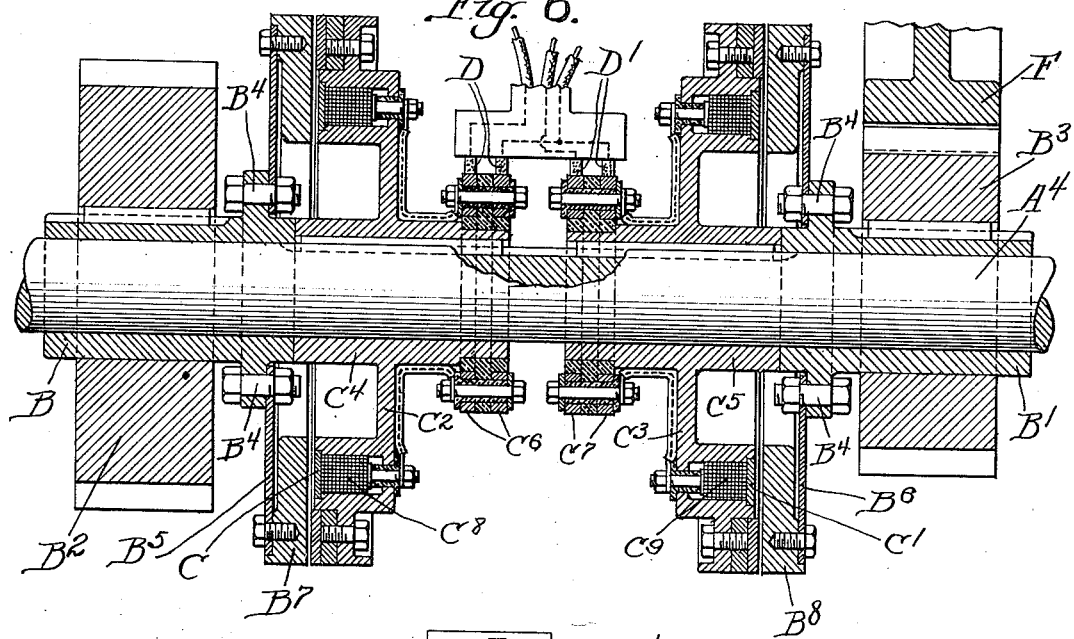
Fig. 6 is a section on the line 6—6 of Fig. 3.

A is a machinery supporting framework of any suitable type supported on a base $A^1$ and having an upper portion $A^2$ adapted to support the various shaft bearings. Rotating in the bearings $A^3$ $A^3$ is a shaft $A^4$ normally in constant uniform rotation, driven through the pulley $A^5$ and the belt $A^6$ from a power source not herein shown.

Mounted on the shaft is a driving pulley $A^7$ adapted to drive a belt $A^8$ which actuates a generator $A^9$ through the pulley $A^{10}$.

Rotatably mounted on the shaft $A^4$ are the sleeves B, $B^1$, to which are keyed the pinions $B^2$, $B^3$. Secured to the same sleeves, as for example by the bolts $B^4$, are the clutch disks $B^5$, $B^6$, to which are secured the frictional clutch elements $B^7$, $B^8$, of any suitable material.

Opposed to these clutch elements are the magnetic clutch rings C, $C^1$, secured by webs $C^2$, $C^3$, to hubs $C^4$, $C^5$, keyed to the shaft $A^4$. Mounted on these hubs are collector rings $C^6$, $C^7$, suitably connected, electrically, to the magnetic coils $C^8$, $C^9$, lying within the rings C, $C^1$.

Suitable brushes, D, $D^1$, contact the collector rings $C^6$, $C^7$, and by electric connections, the details of which are not essential to this invention, deliver to the coils of the clutches current from the generator $A^9$.

Mounted on the lower portion of the supporting framework on brackets $A^{11}$, $A^{12}$, and rotating in bearings $A^{13}$, $A^{14}$, is a countershaft E, having mounted on one end thereof the pinion $E^1$ in mesh with the pinion $B^2$ on the shaft $A^4$, and having mounted on the opposite end the pinion $E^2$ in mesh with the gear F mounted on the shaft $F^1$ which is supported in the bearings $F^2$, $F^3$, of the upper frame portion. Keyed to the shaft E midway of its length is the brake drum $E^3$, which is adapted to be engaged by the brake shoes $E^4$, $E^5$. The brake shoe $E^4$ is pivoted to the link $E^6$, which is itself pivoted as at $E^7$ to a plate $E^8$ on the base A and supports a substantially circular disk $E^9$ adapted to fit within a hollow $E^{10}$ in the opposed magnetic brake element $E^{11}$. The coiled spring $E^{12}$ tends to separate the parts $E^9$ and $E^{11}$ and thus to force the shoe $E^4$ into engagement with the brake drum $E^3$. The shoe $E^5$ is pivoted to the link $E^{13}$, which in turn is pivoted as at $E^{14}$ to the plate $E^8$. The upper end of the link is pivotally and adjustably secured to the rod $E^{15}$, the opposite end of which is pivoted to the brake element $E^{11}$. Thus when the spring $E^{12}$ is not opposed it tends to draw the two brake shoes together against the brake drum, a tendency which is interrupted by the attraction of the magnetic brake element when the coil $E^{16}$ is electrically connected to the generator $A^9$, as for example by the wires $X^6$—$X^8$.

The shaft $F^1$, on which is mounted the gear F, has at its opposite end the pinion $F^4$, which is in mesh with the gear $F^5$ on the drum shaft $F^6$. The drum $F^7$ on the shaft $F^6$ is adapted to receive a cable or cables in the usual manner.

Figure 7:
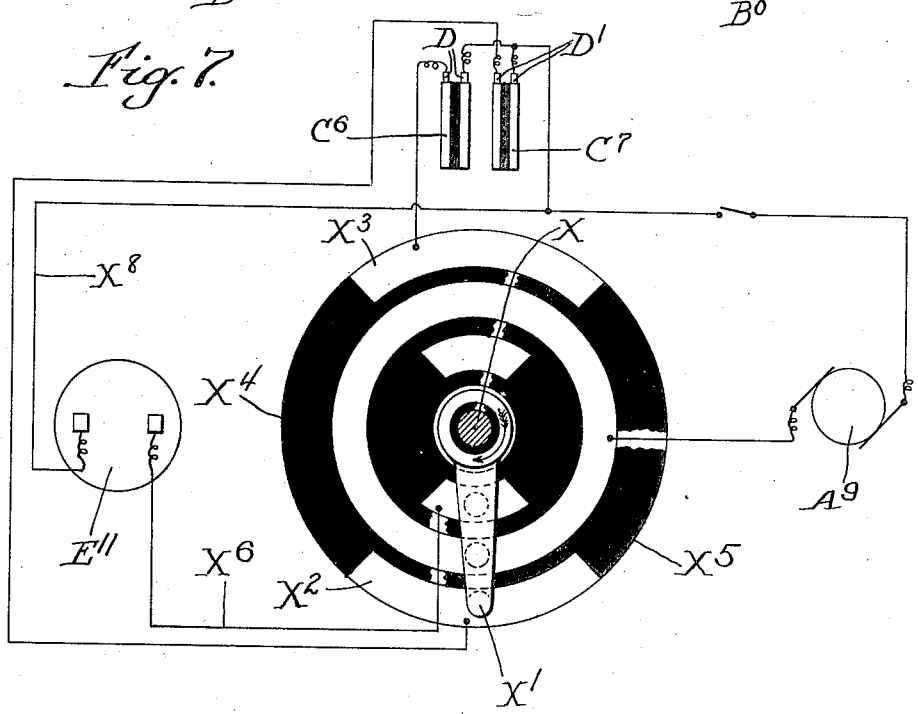
Fig. 7 is a purely diagrammatic showing of timing and control means.

The electric connections and control means are diagrammatically shown in Fig. 7, which illustrates a timing shaft X having thereon a timing arm $X^1$ adapted during its revolution, during the upward excursion of the hoist, to make the electric connection for one magnet clutch, and during the opposite excursion of the hoist to make the electric connection for the other clutch. Intermediate these two positive clutch connections are intervals in which both clutches are electrically disconnected. Segment $X^2$ diagrammatically illustrates the positive connection during the upward excursion and segment $X^3$ the positive connection during the downward excursion. Segments $X^4$ and $X^5$ illustrate the pause at top and bottom respectively of the hoisting excursion. The electric brake connection through $X^6$, the brake $X^7$ and $X^8$ is diagrammatically shown as being made during these periods of pause, the brake being adapted to be electrically disconnected when both clutches are out, to operate the spring actuated shoes to prevent the release of the brake drum. This showing is purely diagrammatic and is intended merely to illustrate the type of electric connections employed by applicant. In practice, an automatic electric control is used with the usual type of inclosed control panel and with a dash pot, if desired, which permits a delay of several seconds at the top and bottom of the hoisting excursion. This equipment may be started by any suitable connection or switch, for example the usual form of electric push-button. The details of switch and timing control are not shown, since in practice they vary to suit local conditions, and since they are well known to all in the electrical art.

In addition, I provide a machine type, traveling limit switch which may be geared directly to the drum shaft, and which automatically cuts out the current at the limit of the travel of the drum, thus disconnecting the electric clutch by which the driving pinion is secured against rotation on the driving shaft. The details of this limit switch are not illustrated in the drawings, since many such switches are well known in the hoisting art and the details thereof form no part of the present invention.

While I have illustrated an operative structure, it is obvious that many changes might be made in the number, shape, proportion and relation of parts, and that the description and drawings are to be taken as to a large extent merely illustrative and diagrammatic. I do not wish to be in any sense restricted to the specific form or details herein illustrated.

The use and operation of my invention are as follows:

I have developed an automatic reversing hoist which is adapted to be driven from a constantly rotated shaft. On this shaft are two pinions adapted alternately to rotate with said shaft and to ride freely in relation thereto. One of such pinions is adapted directly to drive the gear F and through it rotate the hoisting drum in one direction, while the other pinion drives the gear F through the intermediary of a countershaft and thus drives the drum in the opposite direction. These pinions are associated with electrical clutch elements which are opposed to clutch elements fixed to the shaft. These electric clutches are so connected that when one is in operation the other is out of operation.

I provide any suitable timing arrangement, so that an interval is provided for at the end of each excursion of the hoist—for example, for loading or unloading, in which neither clutch is in operation. In order that the drum may not be released during such pause, I provide an electric brake on the countershaft which is adapted to hold the countershaft and, through the train of gears controlled thereby, the drum during the pause in the hoisting operation.

I have illustrated certain types of electrical clutch and electrical brake, but it is obvious that the same result could be obtained by other types of electrical apparatus and even by non-electrical apparatus. The characteristic of my invention is the provision of the alternately active clutches and the association with them of a brake and the operation of both clutches and brake by electricity.

I claim:

1. In an automatic reversing hoist, a power source and a drive shaft adapted to be continuously driven therefrom in a constant direction of rotation, a driven shaft adapted to be driven from said drive shaft, a pair of pinions rotatably mounted on said drive shaft and an independent driving connection between each of said pinions and the driven shaft, a clutch element for each of said pinions rotatable upon the drive shaft but in non-rotatable relation with said pinion, magnetic clutch members, non-rotatable on the drive shaft, opposed to each of said clutch elements, and electric connections therefor, control means whereby the magnetic clutch members may be singly actuated, a brake adapted intermittently to control said driven shaft, and automatic control means whereby said magnetic clutch members may be actuated one at a time, and whereby said brake is actuated in the intervals of the actuation of said clutch members.

2. In an automatic reversing hoist, a power source and a drive shaft adapted to be continuously driven therefrom in a constant direction of rotation, a driven shaft adapted to be driven from said drive shaft, a pair of pinions rotatably mounted on said drive shaft and an independent driving connection between each of said pinions and the driven shaft, a clutch element for each of said pinions rotatable upon the drive shaft but in non-rotatable relation with said pinion, magnetic clutch members, non-rotatable on the drive shaft, opposed to each of said clutch elements, and electric connections therefor, a brake adapted intermittently to control said driven shaft and automatic control means whereby said magnetic clutch members may be alternately actuated with a pre-determined interval therebetween and whereby said brake is automatically actuated throughout the intervals between actuation of the clutch members.

3. In an automatic reversing hoist, a power source and a drive shaft adapted to be continuously driven therefrom in a constant direction of rotation, a driven shaft adapted to be driven from said drive shaft, a pair of pinions rotatably mounted on said drive shaft and an independent driving connection between each of said pinions and the driven shaft, a clutch element for each of said pinions rotatable upon the drive shaft but in non-rotatable relation with said pinion, magnetic clutch members, non-rotatable on the drive shaft, opposed to each of said clutch elements, and electric connections therefor, a brake adapted intermittently to control said driven shaft and a magnetic actuating means therefor, and a unitary electric control means adapted to actuate the magnetic clutch members alternately with a pre-determined interval between such actuations and to automatically actuate the brake throughout the intervals between actuation of the clutch members.

4. In an automatic reversing hoist, a power source and a drive shaft adapted to be continuously driven therefrom in a constant direction of rotation, a driven shaft adapted to be driven from said drive shaft, a pair of pinions rotatably mounted on said drive shaft and an independent driving connection between each of said pinions and the driven shaft, a clutch element for each of said pinions rotatable upon the drive shaft but in non-rotatable relation with said pinion, magnetic clutch members, non-rotatable on the drive shaft, opposed to each of said clutch elements, and electric connections therefor, a brake adapted intermittently to control said driven shaft and a magnetic actuating means therefor, and a unitary electric control means adapted to actuate the magnetic clutch members alternately for a pre-determined period with a pre-determined interval between said periods of actuation and to automatically actuate the brake throughout the intervals between actuation of the clutch members.

Signed at Chicago, county of Cook and State of Illinois, this 18th day of July, 1921.

CLYDE P. ROSS.